US009300721B2

(12) United States Patent
Liu et al.

(10) Patent No.: US 9,300,721 B2
(45) Date of Patent: Mar. 29, 2016

(54) METHOD, APPARATUS AND SYSTEM FOR FILE TRANSFER BASED ON FILE DIRECTORY

(75) Inventors: Geng Liu, Hangzhou (CN); Yipeng Lu, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 12/937,567

(22) PCT Filed: Aug. 24, 2010

(86) PCT No.: PCT/US2010/046447
§ 371 (c)(1),
(2), (4) Date: Oct. 13, 2010

(87) PCT Pub. No.: WO2011/031446
PCT Pub. Date: Mar. 17, 2011

(65) Prior Publication Data
US 2012/0166549 A1 Jun. 28, 2012

(30) Foreign Application Priority Data
Sep. 14, 2009 (CN) .......................... 2009 1 0169488

(51) Int. Cl.
G06F 15/16 (2006.01)
H04L 29/08 (2006.01)
H04L 12/58 (2006.01)

(52) U.S. Cl.
CPC ............... *H04L 67/06* (2013.01); *H04L 51/04* (2013.01); *H04L 51/08* (2013.01); *H04L 67/104* (2013.01)

(58) Field of Classification Search
None
See application file for complete search history.

(56) References Cited

U.S. PATENT DOCUMENTS 6,668,276 B1  12/2003  Ohkado et al.
6,765,868 B1  7/2004  Dunn et al.
(Continued)

FOREIGN PATENT DOCUMENTS

CN  1609858  4/2005
CN  1722731  1/2006
(Continued)

OTHER PUBLICATIONS

"Free Ways to Synchronize Folders Between Computers". lifehacker. Posted on the Internet at http://lifehacker.com/372175/free-ways-to-synchronize-folders-between-computers. Mar. 26, 2008.*
(Continued)

*Primary Examiner* — Scott B Christensen
(74) *Attorney, Agent, or Firm* — Van Pelt, Yi & James LLP

(57) ABSTRACT

The present disclosure provides a file directory-based file transfer method, apparatus and system to address the problem that conventional instant messaging (IM) systems cannot directly implement one-time transfer of an entire file directory. In one aspect, a the sending IM client sends files under root directories of one or more file folders under a file directory one file folder after another. Before sending files under a root directory of a respective file folder, the receiving IM client may send a notification message including a name of the respective file folder and location information of the respective folder under the file directory, and then send all files under the root directory of the respective file folder one-by-one. The receiving IM client establishes a file folder according to the received notification message, and stores files received after the notification message into a root directory of the established file folder.

19 Claims, 5 Drawing Sheets

(56) References Cited

U.S. PATENT DOCUMENTS

| | | |
|---|---|---|
| 6,789,090 B1 | 9/2004 | Miyake et al. |
| 6,912,543 B2 | 6/2005 | Agulhon |
| 6,938,039 B1 | 8/2005 | Bober et al. |
| 6,947,985 B2 | 9/2005 | Hegli et al. |
| 6,970,847 B1 | 11/2005 | Melen et al. |
| 7,089,279 B1 | 8/2006 | Sakaguchi |
| 7,136,901 B2 | 11/2006 | Chung et al. |
| 7,216,114 B2 | 5/2007 | Hendricks |
| 7,346,664 B2 | 3/2008 | Wong et al. |
| 7,353,252 B1 | 4/2008 | Yang et al. |
| 7,441,077 B2 | 10/2008 | Tan et al. |
| 7,469,260 B2 | 12/2008 | Enko et al. |
| 7,469,620 B2 | 12/2008 | Fagan |
| 7,587,422 B2 | 9/2009 | Wong et al. |
| 7,590,667 B2 | 9/2009 | Yasuda et al. |
| 7,613,770 B2 | 11/2009 | Li |
| 7,620,618 B2 | 11/2009 | Tsukamoto |
| 7,627,898 B2 | 12/2009 | Beck et al. |
| 7,779,034 B2 | 8/2010 | Pedersen et al. |
| 7,779,077 B2 | 8/2010 | Cho |
| 7,804,626 B2 | 9/2010 | Satoh et al. |
| 7,822,595 B2 | 10/2010 | Brunet et al. |
| 7,844,579 B2 | 11/2010 | Peterson et al. |
| 7,937,393 B2 | 5/2011 | Prahlad et al. |
| 8,078,686 B2 | 12/2011 | Sjoblom et al. |
| 8,094,647 B2 | 1/2012 | Elliott et al. |
| 8,266,136 B1 | 9/2012 | Pogde et al. |
| 2001/0056469 A1 | 12/2001 | Oonuki |
| 2002/0133491 A1 | 9/2002 | Sim et al. |
| 2002/0152194 A1 | 10/2002 | Sathyanarayan |
| 2003/0014477 A1 | 1/2003 | Oppenheimer et al. |
| 2003/0132967 A1 | 7/2003 | Gangadharan |
| 2004/0103156 A1 | 5/2004 | Quillen et al. |
| 2004/0133550 A1 | 7/2004 | Okamura |
| 2004/0199514 A1 | 10/2004 | Rosenblatt et al. |
| 2004/0205152 A1 | 10/2004 | Yasuda et al. |
| 2005/0091289 A1 | 4/2005 | Shappell et al. |
| 2005/0131900 A1 | 6/2005 | Palliyll et al. |
| 2005/0185823 A1 | 8/2005 | Brown et al. |
| 2005/0223073 A1 | 10/2005 | Malik |
| 2006/0031560 A1 | 2/2006 | Warshavsky et al. |
| 2006/0031673 A1 | 2/2006 | Beck et al. |
| 2006/0129898 A1 | 6/2006 | Park et al. |
| 2006/0184673 A1 | 8/2006 | Liebman |
| 2006/0248122 A1 | 11/2006 | Nikiel et al. |
| 2007/0005707 A1* | 1/2007 | Teodosiu et al. ............... 709/206 |
| 2007/0011167 A1 | 1/2007 | Krishnaprasad et al. |
| 2007/0100888 A1 | 5/2007 | Kim et al. |
| 2007/0168431 A1 | 7/2007 | Lyle et al. |
| 2007/0203917 A1 | 8/2007 | Du et al. |
| 2007/0244908 A1 | 10/2007 | Rajan |
| 2007/0244987 A1 | 10/2007 | Pedersen et al. |
| 2007/0245409 A1 | 10/2007 | Harris et al. |
| 2007/0260643 A1 | 11/2007 | Borden et al. |
| 2008/0033902 A1 | 2/2008 | Glaizel et al. |
| 2008/0133610 A1 | 6/2008 | Jung et al. |
| 2009/0037433 A1 | 2/2009 | Nakamura et al. |
| 2009/0037519 A1 | 2/2009 | Young |
| 2009/0132548 A1 | 5/2009 | Kagawa et al. |
| 2010/0145774 A1 | 6/2010 | Veshnyakov et al. |
| 2010/0211599 A1 | 8/2010 | Cao |
| 2011/0029619 A1* | 2/2011 | Bai ............................... 709/206 |
| 2011/0145345 A1 | 6/2011 | Wysham |

FOREIGN PATENT DOCUMENTS

| | | |
|---|---|---|
| CN | 101014022 | 8/2007 |
| CN | 101098310 | 1/2008 |
| CN | 101106542 | 1/2008 |
| CN | 101272311 | 9/2008 |
| EP | 1763187 | 3/2007 |
| JP | 01290046 | 11/1989 |
| JP | H07248954 | 9/1995 |
| JP | 09179727 | 7/1997 |
| JP | H10214240 | 8/1998 |
| JP | 10340048 | 12/1998 |
| JP | H11232159 | 8/1999 |
| JP | 2001117827 | 4/2001 |
| JP | 2001290695 | 10/2001 |
| JP | 2003218851 | 7/2003 |
| JP | 2003330836 | 11/2003 |
| JP | 2005128874 | 5/2005 |
| JP | 2005129061 | 5/2005 |
| JP | 2005182169 | 7/2005 |
| JP | 2005251144 | 9/2005 |
| JP | 2005301809 | 10/2005 |
| JP | 2007004301 | 1/2007 |
| JP | 2007140951 | 6/2007 |
| JP | 2007312381 | 11/2007 |
| WO | 2007107069 | 9/2007 |

OTHER PUBLICATIONS

Chinese Office Action mailed Apr. 14, 2011 for Chinese patent application No. 200810084253.6, a counterpart foreign application of U.S. Appl. No. 12/600,449, 7 pages.

Chinese Office Action mailed Mar. 12, 2012 for Chinese patent application No. 200810084253.6, a counterpart foreign application of U.S. Appl. No. 12/600,449, 7 pages.

Final Office Action for U.S. Appl. No. 12/600,449 mailed on Mar. 13, 2012, Zhenguo Bai, "File Folder Transmission on Network," 21 pages.

Non-Final Office Action for U.S. Appl. No. 12/600,449, mailed on Oct. 26, 2011, Zhenguo Bai, "File Folder Transmission on Network," 16 pages.

Sato, "File Publishing Server by CVSup and DVSync," UNIX USER, vol. 13, No. 6, pp. 131 to 138, Softbank Publishing, In., Japan, Jun. 1, 2004.

Translated Japanese Office Action mailed Aug. 6, 2013 for Japanese patent application No. 2011-502130, a counterpart foreign application of U.S. Pat. No. 8,359,358, 6 pages.

Translated Japanese Office Action mailed Mar. 17, 2015 for Japanese patent application No. 2014-046841, a counterpart foreign application of U.S. Appl. No. 12/600,449, 7 pages.

Translated Chinese Office Action mailed Apr. 14, 2011 for Chinese patent application No. 200810084253.6, a counterpart foreign application of U.S. Appl. No. 12/600,449, 7 pages.

Translated Chinese Office Action mailed Mar. 12, 2012 for Chinese patent application No. 200810084253.6, a counterpart foreign application of U.S. Appl. No. 12/600,449, 7 pages.

* cited by examiner

METHOD, APPARATUS AND SYSTEM FOR FILE TRANSFER BASED ON FILE DIRECTORY

CROSS REFERENCE TO RELATED PATENT APPLICATIONS

This application is a national stage application of an international patent application PCT/US10/046447, filed on Aug. 24, 2010, which claims priority from Chinese Patent Application No. 200910169488.X, filed on Sep. 14, 2009, entitled "METHOD, APPARATUS AND SYSTEM FOR FILE TRANSFER BASED ON FILE DIRECTORY," which applications are hereby incorporated in their entirety by reference.

TECHNICAL FIELD

The present disclosure relates to the communication field, and particularly relates to file transfer based on file decretory in an instant messaging system.

BACKGROUND

Instant messaging (IM) is a real-time messaging service that allows a user to establish certain chat room in a network. It mainly includes an IM server and multiple IM clients. Peer-to-peer (P2P) is a communications technology in which each party has the same capabilities, by which the use can user a direct connection between computers to share and transfer files.

In a conventional IM system, a user can use the IM clients to implement P2P communications. When transferring files, a sender's client software that resides on the sender's computing device (hereinafter generally referred to as "client") establishes a P2P connection with a receiver's client, and transfers the files one by one. The pitfall is that such method cannot directly transfer files based on a file directory. In other words, the sender's client cannot automatically transfer all files under the file directory, without the user's intervention, to the receiver's client. Likewise, the receiver's client cannot automatically store the received files into an equivalent file directory as that on the sender's side.

SUMMARY OF THE DISCLOSURE

The present disclosure provides an apparatus and system to transfer files based on a file directory to solve the conventional IM system's problem to transfer files based on the file directory.

The techniques provided by the present disclosure are summarized below.

In one embodiment, a file transfer method based on a file directory may comprise a number of steps as described below:

An IM client of a sender sends files under a respective root directory of each file folder of a file directory one file folder at a time. Before sending files under the root directory of a respective file folder, a notification message is first sent. The notification message includes a name of the current file folder and a location of the current file folder under the file directory. The IM client of the sender then sends files under the root directory of the current file folder.

The IM client of a receiver establishes a file folder based on the received notification message, and stores files received after the notification message under a root director of the established file folder.

In another embodiment, a file transfer system based on a file directory is provided. The file transfer system may include an IM client of a sender and an IM client of a receiver as described below.

The IM client of the sender sends files under a respective root directory of each file folder of a file directory one file folder at a time. Before sending files under the root directory of a respective file folder, the IM client of the sender first sends a notification message. The notification message includes a name of the current file folder and a location of the current file folder under the file directory. The IM client of the sender then sends files under the root directory of the current file folder.

The IM client of the receiver establishes a file folder based on the received notification message, and stores files received after the notification message under a root directory of the established file folder.

In another embodiment, a client for file transfer based on a file directory is provided. The client may include a sending module and a receiving module as described below.

The sending module is configured to send files under a respective root directory of each file folder of a file directory one file folder at a time. Before sending files under the root directory of a respective file folder, the sending module first sends a notification message. The notification message includes a name of the current file folder and a location of the current file folder under the file directory. The sending module then sends files under the root directory of the current file folder; and The receiving module is configured to receive the notification message including the name of the current file folder and the location of the current file folder under the file directory, to establish a file folder based on the received notification message, and to store files received after the notification message under a root directory of the established file folder.

In the above embodiments of the present disclosure, the IM client of the sender, before sending files under a root directory of a respective file folder, sends the notification message including the name of the current file folder and the location of the current file folder in the file directory, so that the IM client of the receiver can establish a corresponding file folder based on the received notification message, as well as store the files received afterwards under the established file folder. Thus the IM client of the receiver can store the files into the same file directory structure as that of the IM client of the sender to implement file transfer based on the file directory between IM clients.

In an alternative embodiment, another file directory transfer method is provided. The method may comprise a number of steps as described below.

An IM client of a sender first sends directory information of a file directory, and then sends files under a respective root directory of each file folder of a file directory one file folder at a time. Before sending files under the root directory of a respective file folder, the IM client of the sender sends a notification message. The notification message includes a name of the current file folder and a location of the current file folder under the file directory. The IM client of the sender then sends files under the root directory of the current file folder; and An IM client of a receiver establishes a file directory based on the received file directory information, and locates a file folder under the established file directory based on the received notification message, and stores files received after the notification message under a root directory of the located file folder.

In still another embodiment, a client for file directory transfer is provided. The client may include a sending module and a receiving module.

The sending module is configured to first send directory information of a file directory, and then to send files under a respective root directory of each file folder of a file directory one file folder at a time. Before sending files under the root directory of a respective file folder, the sending module first sends a notification message. The notification message includes a name of the current file folder and a location of the current file folder under the file directory. The sending module then sends files under the root directory of the current file folder.

The receiving module is configured to receive the file directory information sent by another client for file directory transfer, to establish a file directory based on the received file directory information; to receive the notification message sent by the another client for file directory transfer, including the name of the current file folder and the location of the current file folder in the file directory, to locate the file folder under the established file directory based on the received notification message, and to store files received after the notification message under a root directory of the located file folder.

In the above embodiments of the present disclosure, the IM client of the sender, before sending files under the file directory, sends structure information of the file directory to the IM client of the receiver to establish a corresponding file directory at the receiver end. The IM client of the sender, before sending files under a root directory of a respective folder, provides a notification message that includes location information of the folder under the file directory to the IM client of the receiver so that the IM client of the receiver can locate a corresponding folder based on the notification message, and store files received afterwards into the folder. Thus, the IM client of the receiver can establish an equivalent file directory as the file directory transferred by the IM client of the sender to implement file transfer based on file directory between IM clients.

DETAILED DESCRIPTION

The embodiments of the present disclosure are described in detail below with reference to the figures.

Figure 1:
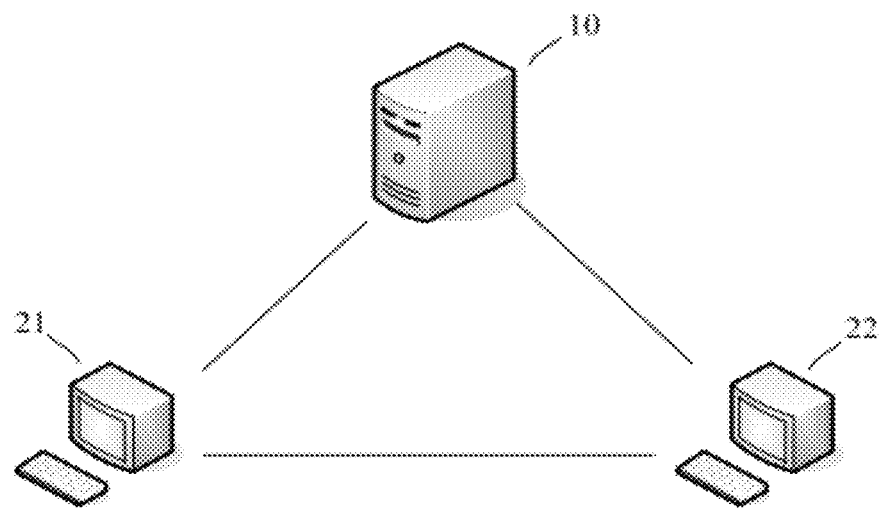
FIG. 1 illustrates a system structure diagram of a P2P file directory transfer environment in accordance with the present disclosure.

FIG. 1 illustrates a system structure diagram of a P2P file directory transfer environment in accordance with the present disclosure. As shown, the system structure is an IM system structure. Generally, the IM system structure includes multiple IM clients and possibly more than one IM server, although two IM clients and one IM server are illustrated in FIG. 1. The present disclosure uses the IM system structure as shown in the FIG. 1 as an example. The IM system structure shown in FIG. 1 includes an IM server 10, an IM client 21, and an IM client 22. The major functions of IM server 10 may include: authentication and management of an IM client login system, management of user information in the IM system, and forwarding a file when there is a need to transfer the file between IM clients. The IM client 21 and IM client 22 can communicate by instant messaging and transfer a file by conventional method.

An embodiment of the present disclosure improves the IM client and increases a function to transfer file based on a file directory. Correspondingly, the embodiment also improves the IM server (or any other server in the IM system, such as a relay server) to support the function of forwarding a file directory.

Figure 2:
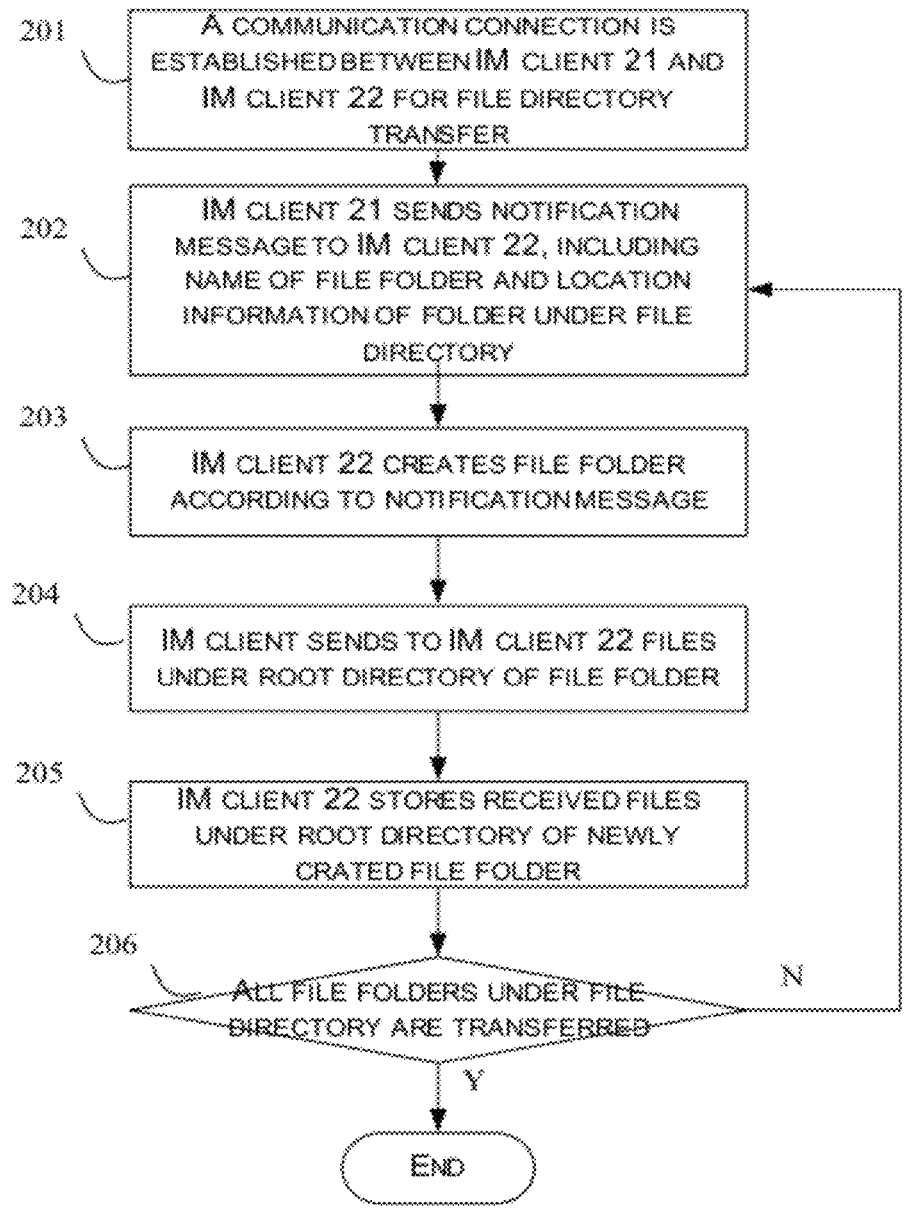
FIG. 2 illustrates a flowchart of P2P file directory transfer in accordance with the present disclosure.

FIG. 2 illustrates a flowchart of P2P file directory transfer in accordance with the present disclosure. When a user intends to use IM client 21 to transfer a file directory and all file folders and files under the file directory to IM client 22, the user can, for example, use a mouse or any other method to choose the file directory to be transferred (or selection of one or more file folders) and drag it into a window for an IM interaction with a target user. Generally, an operation system where the sending IM client resides can capture such operation and a target of the operation (or the selected file folder), obtain information of the target (or a location, a size, contained files or sub-folders, and other information of the file folder), and transfer the obtained information to the receiving IM client. In this example, the IM client 21, after receiving the aforementioned information, triggers a file directory transfer event (a corresponding relationship between such operation type and target and the file directory transfer event can be pre-established, or the above operation triggers the file directory transfer event), and triggers a process of file directory transfer according to the event. Another method to trigger the process of file directory transfer is described below. A command button for file directory transfer is pre-established at an interactive IM communication window at the IM client 21. When the button is clicked, a dialog box or an input box is popped up to let the user select or input the file directory. Given the user selected or input file directory, the file directory information is obtained and the file directory transfer event is triggered, and the process of file directory transfer is triggered according to the event.

The process of file directory transfer is shown in FIG. 2, which may include a number of steps as described below.

At 201, the process establishes a P2P connection between IM client 21 and IM client 22. Such connection is used in the upcoming file directory transfer, such as by establishing a file transfer protocol (FTP) connection for example.

At 202, the IM client 21 sends a notification message to IM client 22. The notification message includes a name of a file folder under the file directory to be transferred and a location of the file folder under the file directory.

At 203, the IM client 22 receives the notification message, and establishes a file folder according to the name of the file folder under the file directory and the location of the file folder under the file directory. IM client 22 can establish the file directory and the contained file folders at a default location, or at a user designated location.

At 204, the IM client 21 sends files under a root directory of the file folder one by one to IM client 22.

At 205, the IM client 22 stores the received files under a root directory of the newly established file folder.

The steps 202-205 are repeated until all files under all file folders and their root directories under the file directory are transferred (by reference to a step 206). The IM client 22 establishes an equivalent file directory with the same file directory structure and the same contained files as those at the IM client 21. After completion of the entire file directory transfer, the communication connection between IM client 21 and IM client 22 for the file directory transfer can be disconnected. As IM client 21 knows in advance the information of the file directory (including all files contained in the file directory), when a file is transferred, IM client 21 can determine whether all files under the file directory have been transferred. Otherwise, either the file transfer can be continued or the P2P connection is disconnected.

The above process shows that there only needs to be one communication connection for the file directory transfer between IM client 21 and IM client 22. The process of the file directory transfer utilizes the one communication connection. Compared with the conventional technology that the IM client of the sender needs to establish communication connection with the IM client of the receiver each time before transferring a file, the techniques proposed by the present disclosure saves the cost in establishing the connection and thus improves file transfer performance.

Another embodiment of the present disclosure can be obtained by improvement of the process as shown in FIG. 2. In the current embodiment, after establishing the P2P connection between IM client 21 and IM client 22, IM client 21 can firstly send directory information of the file directory to be transferred (including all contained file folders and a hierarchical relationship between the file folders) to IM client 22. IM client 22 can establish a corresponding file directory based on the directory information. Later operations in which IM client 21 sends files are similar as the process described above. The notification message, however, needs to carry only the location information of the current file folder in the file directory. Correspondingly, after IM client 22 receives the notification message, it need not establish a file folder but locates a corresponding file folder in the established file directory, and stores files received afterwards under a root directory of the located file folder.

The P2P connection for file transfer between IM client 21 and IM client 22 might not be successful sometimes. For example, IM client 22 may be offline. For such scenario, another embodiment of the present disclosure provides a server for relay to implement transferring files under the file directory. Certainly IM client 21 can directly use a method for server relay to transfer files under the file directory.

Figure 3:
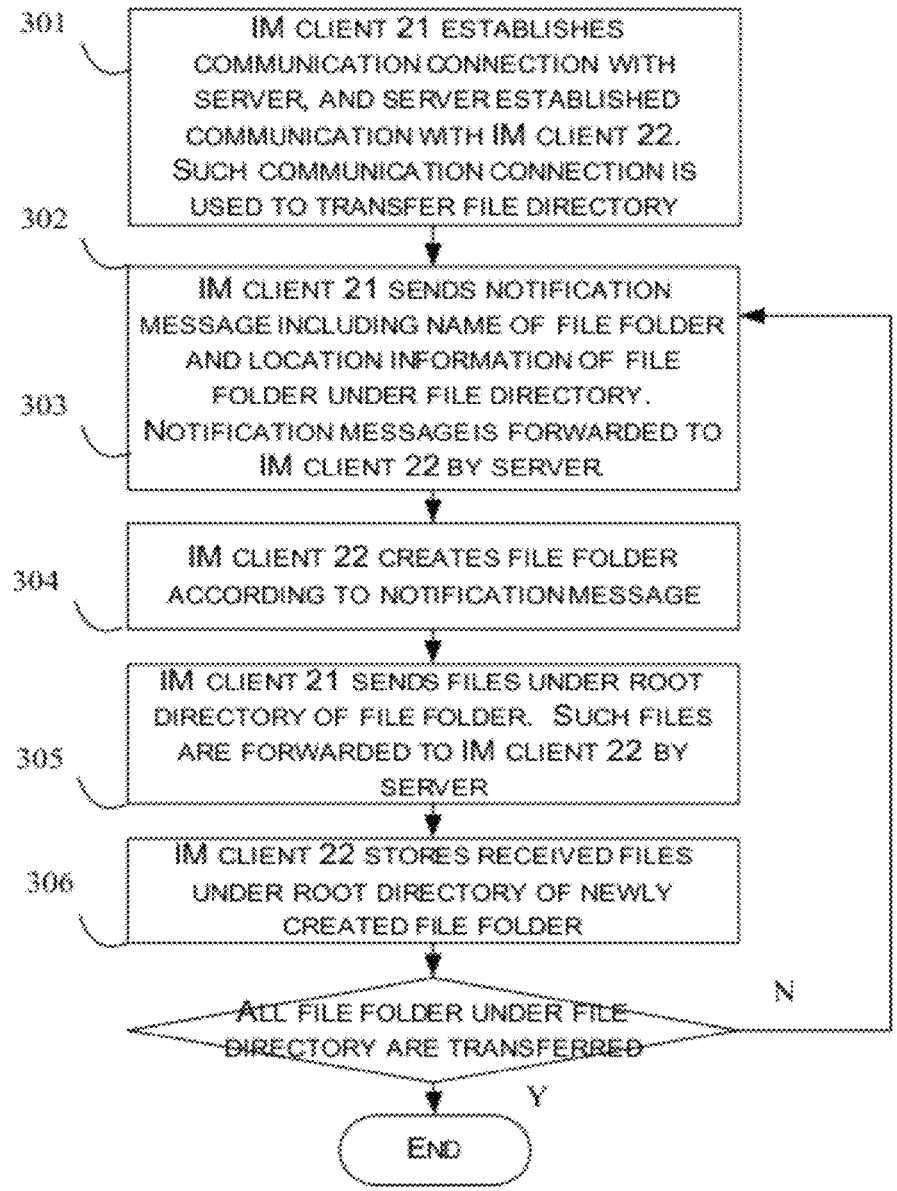
FIG. 3 illustrates a file directory transfer by serve relay in accordance with the present disclosure.

FIG. 3 illustrates a process to use for a relay server to implement transferring files under the file directory in accordance with the present disclosure. This embodiment uses an example of IM server 10 as a relay server and IM client 21 as the client of the sender transfer files under the file directory to IM client 22. The process show in FIG. 3 includes a number of steps as described below.

At 301, the process establishes a communication connection between IM client 21 and IM server 10. The communication connection is used for an upcoming file directory transfer.

At 302, IM client 21 sends a name of a file folder in the file directory to be transferred and location information of the file folder in the file directory, in a form of a notification message, to IM server 10. After receiving the notification message, IM server 10 forwards it to IM client 22.

At 303, after receiving the notification message, IM client 22 establishes a file folder according to the name of the file folder and the location information of the file folder in the file directory.

At 304, IM client 21 sends files under a root directory of the file folder to IM server 10, one by one, and IM server 10 forwards the received files to IM client 22.

At 305, IM client 22 stores the received files in a root directory of the newly established file folder.

The steps 302-305 are repeated until all file folders under the file directory to be transferred and all files under root directories of all file folders have been transferred (by reference to a step 306). Thus, a file directory at IM client 22 having the same file directory structure and the same contained files as those of IM client 21 is created. After transfer of the file directory is complete, the communication connections between IM client 21 and IM server 10, and between IM client 22 and IM server 10, can be disconnected.

In the process as shown in FIG. 3, the relay server can have certain memory space to cache information, such as file data transferred by IM client 21, and then forward the cached information to IM client 22.

Another embodiment of the present disclosure can be obtained by improvement of the process as shown in the FIG. 3. In the current embodiment, IM client 21 can firstly send directory information of the file directory to be transferred (including all contained file folders and a hierarchical relationship between the file folders). IM client 22 can establish a corresponding file directory based on the directory information. Later operations in which IM client 21 sends files are similar as the process described above. The notification message, however, needs to carry only the location information of the current file folder in the file directory. Correspondingly, after IM client 22 receives the notification message, it needs not to establish a file folder but locates a corresponding file folder in the established file directory, and stores files received afterwards under a root directory of the located file folder.

Preferably, in the above embodiments of the present disclosure, before a sending IM client transfers files under the file directory, it can send information through a request for file transfer to the receiving IM client. The information may include a storage space of all files under the file directory and a number of all files under the file directory. Thus receiving IM client can determine whether the storage space of the file directory complies with a preset condition of data volume of the file directory, whether the number of files complies with a preset condition of limitation of file number, or whether a device where the IM client locates has enough storage space for storing all files under the file directory, and return a response to the sending IM client upon the determination result as to either accept or refuse the request for file transfer.

Preferably, in the above embodiments of the present disclosure, before sending files IM client 21 can compress the files and transfer the compressed files. After receiving the compressed files, IM client 22 can decompress the files. It helps to reduce system resources utilized by the file transfer as well as file transfer delays. IM clients 21 and 22 may use a third-party compression tool to compress/decompress the files. Alternatively, a file compression/decompression function module can be integrated with IM clients 21 and 22. IM clients 21 and 22 can use such module to compress/decompress files.

The following description uses an example of a specific file directory to detail a process that IM client 21 transfers a file directory to IM client 22.

Figure 4:
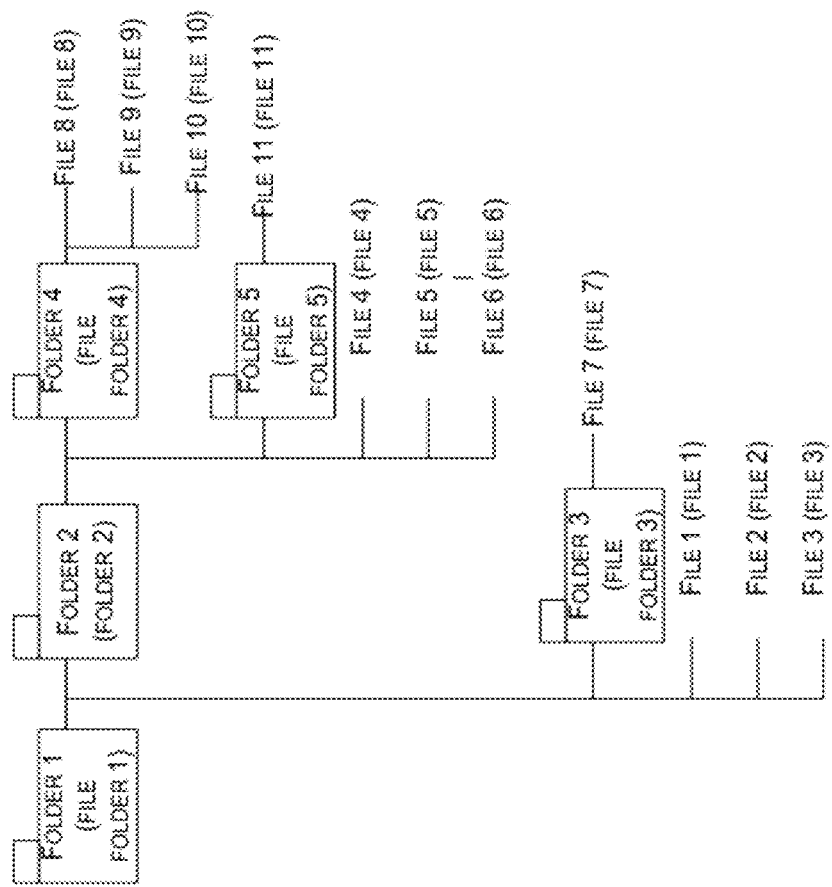
FIG. 4 illustrates a structure diagram of a file directory to be transferred.

In this embodiment, the file directory to be transferred is shown in the FIG. 4. It is a general-purpose and typical file directory structure. In FIG. 4, Folder 1 (file folder 1) is a root file folder of the file directory. Under a root directory of Folder 1, there are two file folders, i.e., Folder 2 (file folder 2) and Folder 3 (file folder 3), and three files, i.e., File 1, File 2, and File 3. Under a root directory of Folder 3, there is a file, i.e., File 7. Under a root directory of Folder 2, there are two folders, i.e., Folder 4 (file folder 4) and Folder 5 (file folder 5), and three files, i.e., File 4, File 5, File 6. Under a root directory of Folder 4, there are three files, i.e., File 8, File 9, and File 10. Under a root directory of Folder 5, there is a file, i.e., File 11.

This embodiment is based on the IM communication system as shown in FIG. 1, and transfers files under the file directory, a structure of which is shown in FIG. 4. The file transfer process is described below.

IM client 21 attempts to establish a P2P connection with IM client 22. If the establishment of a P2P connection is not successful, a connection is established through relay by the IM server. This process uses an example that IM client 21 successfully establishes the P2P connection with IM client 22.

IM client 21 sends a transfer request message to IM client 22. The transfer request message carries information of a total size of the file directory to be transferred. After receiving the transfer request message, IM client 22 determines whether there is enough space locally to store the file directory. If affirmative, IM client 22 returns a response to accept the transfer request; otherwise the file transfer fails and the file directory transfer process ends.

After receiving the response of acceptance of the transfer request, IM client 21 uses Folder 1 as a first file folder to be transferred, and sends a notification to IM client 22. The notification message carries a name of Folder 1 and location information of Folder 1 under the file directory.

As Folder 1 is the root file folder of the file directory to be transferred, the notification message indicates the location of Folder 1 is the root file folder of the file directory. After receiving a notification message sent by IM client 21, IM client 22 creates a file folder according to the name of the file folder and the location of the file folder under the file directory.

IM client 21 compresses files, one by one, under the root directory of Folder 1, i.e., File 1, File 2, and File 3, and transfers the files to IM client 22. After receiving the compressed files from IM client 21, IM client 22 decompresses and stores the files at a root directory of the created Folder 1.

After completing transferring of files under the root directory of Folder 1, IM client 21 sends another notification message to IM client 22, which carries a name of Folder 2 and its location information under the file directory (such as Folder 1/Folder 2 which represents that Folder 2 is a child file folder of Folder 1). After receiving the second notification message from IM client 21, IM client 22 creates a file folder according to the name of the file folder and the location of the file folder included in the another notification message (in other words, Folder 2 is created under Folder 1).

IM client 21 compresses files, one by one, under the root directory of Folder 2, i.e., File 4, File 5, and File 6, and transfers them to IM client 22. After receiving the compressed files from IM client 21, IM client 22 decompresses and stores the files under a root directory of the created Folder 2.

Accordingly, IM client 21 transfers all file folders under the file directory to IM client 22. The device where IM client 22 resides stores a same file directory as the one transferred by IM client 21. The process of file directory transfer is complete.

In the above process, the file directory on IM client 22 is progressively created during the process of file transfer under the file directory. Another alternative process is described as below.

IM client 21 firstly sends the structure information of the file directory (including all file folders and the hierarchical relationship among the file folders) included in the transfer request message to IM client 22. IM client 22 creates a corresponding file directory according to the structure information of the file directory. The subsequent operations in which IM client 21 sends files are similar to the process described above. The sent notification message can include location information of a current file folder under the file directory. For example, before transferring files under the root directory of Folder 2, IM client 21 sends location information of Folder 2, i.e., Folder 1/Folder 2, to IM client 22 through the notification message. Correspondingly, after receiving the notification message, IM client 22 needs not create a file folder. Instead it only needs to locate a corresponding file folder from the created file directory, and stores the files received afterwards in a root directory of the located file folder. This can also be utilized for file directory transfer between IM clients.

Based on the aforementioned techniques, the present disclosure also provides a structure of an IM client.

Figure 5:
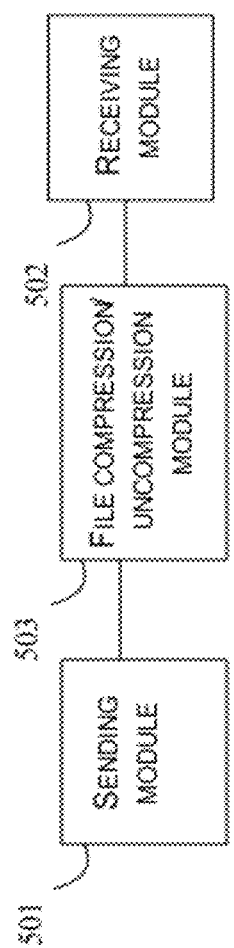
FIG. 5 illustrates a structure diagram of an IM client in accordance with the present disclosure.

FIG. 5 shows a structure diagram of a computing device where an IM client resides. The computing device includes a processor and a storage that is coupled to the processor to store data. The IM client includes a sending module 501 and a receiving module 502, both of which executable by the processor.

The sending module 501 is used to transfer, one file folder after another, files under a respective root directory of a file folder under the file directory to another client for file directory transfer.

The receiving module 502 is used to receive a notification message, sent by another client for file directory transfer, including a name of the file folder and location information of the file folder under the file directory, to create a file folder according to the notification message, and to store files received afterwards (or after the notification message) to a root directory of the crated file folder.

Preferably, the IM client also includes a file compression/decompression module 503, executable by the processor of the computing device, to compress a file to be transferred by the sending module 501, and to decompress the file received by the receiving module 502. When sending a file, the sending module 501 sends the file after it is compressed.

With respect to the above IM client, one alternative plan for the sending module 501 is that the sending module 501 of the sending IM client firstly sends the structure information of the file directory to the receiving IM client for file directory transfer, and then sends files under a root directory of each file folder under the file directory one file folder after another. Before sending files under the root directory of a respective file folder, the sending module 501 firstly sends a notification message including location information of a current file folder under the file directory, and then sends all files under the root directory of the current file folder.

Correspondingly, one alternative plan for the receiving module 502 is that the receiving 502 of the receiving IM client receives structure information of the file directory from the sending IM client for file directory transfer, and creates the file directory according to the structure information of the file directory. The receiving module 502 receives the notification message including the location information of the current file folder under the file directory from the another IM client for file transfer, and locates the file folder under the created file directory according to the notification message, and stores the files received afterwards (or after the notification message) in a root directory of the located file folder.

The present disclosure is described by reference to the flowcharts and diagrams of the method, apparatus (system), and computer software product of the present disclosure. It can be understood that computer software instructions can implement each flowchart and/or diagram of the figures, or a combination thereof. Such computer software instructions can be embedded into a general-purpose computer, a special-purpose computer, an embedded device or any other programmable data processing device to implement a machine that can use the instructions executed by the computer or other programmable data processing device to realize functions designated by one or more flow processes of the flowchart figures and/or one or more diagrams of the diagram figures.

Such computer program instructions may also be stored into a tangible, non-transitory computer-readable storage medium that can function in a specific way and boot the computer or any other programmable data processing device such that the instructions stored in the computer-readable storage medium can implement functions as an instruction apparatus. The instruction apparatus can realize functions designated by one or more flow processes of the flowchart figures and/or one or more diagrams of the diagram figures.

Such computer program instructions may also be loaded into the computer or any other programmable data processing device such that the computer or the programmable data processing device can perform a plurality of operation steps to realize functions by operation of such computer. Thus instructions performed at the computer or any other programmable data processing device implement functions designated by one or more flow processes of the flowchart figures and/or one or more diagrams of the diagram figures.

A person of ordinary skill in the art can make various changes and modifications of the present disclosure without deviating from the spirit and scope of the present disclosure. Therefore, provided that such changes and modifications of the present disclosure are within the coverage of the claims of the present disclosure or its equivalents, the present disclosure also covers such changes and modifications.

What is claimed is:

1. A method of file directory-based file transfer, the method comprising:
   receiving, from an instant messaging (IM) client of a sender, a notification message, the notification message including a name of a first file folder and location information of the first file folder under a file directory, wherein the first file folder includes a first plurality of file folders, the location information of the first file folder includes a hierarchical relationship between the first plurality of file folders, and the hierarchical relationship includes a root directory including a third file folder, the third file folder including a fourth file folder, and the first file folder being selected by a user;
   forwarding the notification message to an IM client of a receiver to establish, at the receiver, a second file folder that corresponds to the first file folder, wherein the second file folder includes a second plurality of file folders corresponding to the first plurality of file folders of the first file folder, and the second plurality of file folders of the second file folder are established based on the hierarchical relationship of the first plurality of file folders of the first file folder;
   establishing a file transfer communication connection with the IM client of the receiver to transfer one or more files under the root directory of the first file folder before the second plurality of file folders of the second file folder have been established;
   after the second plurality of file folders of the second file folder have been established:
      receiving, from the IM client of the sender, the one or more files under the root directory of the first file folder over the file transfer communication connection;
      forwarding the received one or more files under the root directory of the first file folder to the IM client of the receiver to store the received one or more files under a root directory of the second file folder over the file transfer communication connection; and
      disconnecting the file transfer communication connection with the IM client of the receiver after the received one or more files under the root directory of the first file folder including the first plurality of file folders have been forwarded.

2. The method as recited in claim 1, wherein:
   the IM client of the sender sends the notification message and the files via a peer-to-peer (P2P) connection with the IM client of the receiver, and the IM client of the receiver receives the notification message and the files sent by the IM client of the sender via the P2P connection; or
   the IM client of the sender sends the notification message and the files through a server, and the IM client of the receiver receives the notification message and the files sent by the IM client of the sender through the server.

3. The method as recited in claim 1, further comprising:
   prior to receiving the one or more files from the IM client of the sender, receiving, from the IM client of the sender, a transfer request to transfer the file directory, the transfer request including storage space information of the file directory;
   determining whether the receiver has sufficient storage space to store the file directory according to the storage space information included in the transfer request message; and
   when the receiver has sufficient storage space to store the file directory, receiving, from the IM client of the receiver, a response message that accepts the transfer request to transfer the file directory.

4. The method as recited in claim 1, wherein at least one of the files received from the IM client of the sender is compressed by the IM client of the sender, and wherein the at least one of the files is decompressed by the IM client of the receiver after being received by the IM client of the receiver.

5. The method as recited in claim 1, wherein the receiving of the notification message, the forwarding of the notification message, the receiving of the one or more files, and the forwarding of the received one or more files are performed in the same session.

6. The method as recited in claim 1, further comprising:
   determining whether a number of the one or more files exceeds a preset limit; and
   in the event that the number of the one or more files exceeds the preset limit, sending a response to the IM client of the sender refusing the receiving of the one or more files.

7. The method as recited in claim 1, wherein the forwarding of the received one or more files operation and the receiving of the one or more files operation are repeated until all of the one or more files to be transferred from the IM client of the sender are transferred.

8. The method as recited in claim 1, further comprising:
   determining whether the total size of the one or more files exceeds an available amount of storage on the IM client of the receiver; and
   in the event that the total size of the one or more files exceeds the available amount of storage on the IM client of the receiver, sending a response to the IM client of the sender refusing the receiving of the one or more files.

9. The method as recited in claim 1, wherein the receiving of the one or more files includes establishing a file transfer protocol (FTP) connection.

10. The method as recited in claim 1, wherein the forwarding of the received one or more files under the root directory of the first file folder to the IM client of the receiver occurs one by one.

11. The method as recited in claim 1, wherein the root directory of the first file folder includes at least one file folder, the root directory being separate from the at least one file folder.

12. The method as recited in claim 1, wherein the storing of the received one or more files under the root directory of the second file folder includes:
   locating a corresponding file folder from the second plurality of file folders of the second file folder.

13. A system of file directory-based file transfer, the system comprising:
   a processor;
   a server, using the processor, configured to
      receive, from an instant messaging (IM) client of a sender, a notification message, the notification message including a name of a first file folder and location information of the first file folder under a file directory, wherein the first file folder includes a first plurality of file folders, the location information of the first file folder includes a hierarchical relationship between the first plurality of file folders, and the hierarchical relationship includes a root directory including a third file folder, the third file folder including a fourth file folder, and the first file folder being selected by a user;
      forward the notification message to an IM client of a receiver to establish, at the receiver, a second file folder that corresponds to the first file folder, wherein the second file folder includes a second plurality of file folders corresponding to the first plurality of file folders of the first file folder, and the second plurality of file folders of the second file folder are established based on the hierarchical relationship of the first plurality of file folders of the first file folder;
      establish a file transfer communication connection with the IM client of the receiver to transfer one or more files under the root directory of the first file folder before the second plurality of file folders of the second file folder have been established; and
      after the second plurality of file folders of the second file folder have been established:
         receive, from the IM client of the sender, the one or more files under a root directory of the first file folder over the file transfer communication connection;
         forward the received one or more files under the root directory of the first file folder to the IM client of the receiver to store the received one or more files under a root directory of the second file folder over the file transfer communication connection; and
         disconnect the file transfer communication connection with the IM client of the receiver after the received one or more files under the root directory of the first file folder including the first plurality of file folders have been forwarded.

14. The system as recited in claim 13, wherein the server is further configured to:
   prior to receiving the one or more files from the IM client of the sender, receive, from the IM client of the sender, a transfer request to transfer the file directory, the transfer request including storage space information of the file directory;
   determine whether the receiver has sufficient storage space to store the file directory according to the storage space information included in the transfer request message; and
      when the receiver has sufficient storage space to store the file directory, receive, from the IM client of the receiver, a response message that accepts the transfer request to transfer the file directory.

15. The system as recited in claim 13, wherein the server is further configured to:
   receive at least one file from the IM client of the sender that is compressed.

16. A computing device, comprising:
   a processor;
   a storage, coupled to the processor, that stores data;
   a sending module executable by the processor, the sending module configured to:
      send a notification message, the notification message including a name of a first file folder and location information of the first file folder under a file directory, wherein the first file folder includes a first plurality of file folders, the location information of the first file folder includes a hierarchical relationship between the first plurality of file folders, and the hierarchical relationship includes a root directory including a third file folder, the third file folder including a fourth file folder, and the first file folder being selected by a user;
      send one or more files under a root directory of the first file folder; and a receiving module executable by the processor, the receiving module configure to:
      receive the notification message to establish a second file folder that corresponds to the first file folder, wherein the second file folder includes a second plurality of file folders corresponding to the first plurality of file folders of the first file folder, and the second plurality of file folders of the second file folder are established based on the hierarchical relationship of the first plurality of file folders of the first file folder;
      establish a file transfer communication connection to transfer the one or more files under the root directory of the first file folder before the second plurality of file folders of the second file folder have been established; and
      after the second plurality of file folders of the second file folder have been established:
         receive the one or more files under the root directory of the first file folder to store the received one or more files under a root directory of the second file folder over the file transfer communication connection; and
         disconnect the file transfer communication connection after the one or more files under the root directory of the first file folder including the first plurality of file folders have been received.

17. The computing device as recited in claim 16, further comprising:
   a file compression/decompression module executable by the processor, the file compression/decompression module configured to compress a file to be sent by the sending module and decompress a file received by the receiving module, wherein the sending module is configured to send the compressed file.

18. The computing device as recited in claim 16, wherein:
at least one of the sending module and the receiving module is configured to establish communication with an instant messaging (IM) client residing on another computing device via a peer-to-peer (P2P) connection.

19. The computing device as recited in claim 16, wherein:
prior to sending the one or more files, the sending module sends a first transfer request to transfer the file directory, the transfer request including storage space information of the file directory;

the receiving module, upon receiving a second transfer request, determines whether there is sufficient storage space to store the file directory according to the storage space information included in the second transfer request message; and when there is sufficient storage space to store the file directory, the receiving module sends a response message that accepts the second transfer request to transfer the file directory.

* * * * *